US006554618B1

(12) United States Patent
Lockwood

(10) Patent No.: US 6,554,618 B1
(45) Date of Patent: Apr. 29, 2003

(54) MANAGED INTEGRATED TEACHING PROVIDING INDIVIDUALIZED INSTRUCTION

(76) Inventor: Cheryl B. Lockwood, 4028 Chesapeake Ave., Hampton, VA (US) 23669

( * ) Notice: Subject to any disclaimer, the term of this patent is extended or adjusted under 35 U.S.C. 154(b) by 223 days.

(21) Appl. No.: 09/838,899

(22) Filed: Apr. 20, 2001

(51) Int. Cl.⁷ .............................................. G09B 3/00
(52) U.S. Cl. ...................... 434/322; 434/118; 434/362; 434/350
(58) Field of Search ............................... 434/322, 323, 434/118, 327, 350, 362, 365, 307 R, 119, 308

(56) References Cited

U.S. PATENT DOCUMENTS

| | | | |
|---|---|---|---|
| 5,100,329 A | 3/1992 | Deesen et al. ............... | 434/327 |
| 5,421,730 A * | 6/1995 | Lasker et al. ................ | 434/118 |
| 5,597,312 A * | 1/1997 | Bloom et al. ................ | 434/362 |
| RE36,028 E | 1/1999 | Deesen et al. ............... | 434/327 |
| 5,904,485 A | 5/1999 | Siefert .......................... | 434/322 |
| 5,957,699 A | 9/1999 | Peterson et al. ............. | 434/350 |
| 6,024,577 A | 2/2000 | Wadahama et al. .......... | 434/322 |
| 6,029,043 A | 2/2000 | Ho et al. ...................... | 434/350 |
| 6,091,930 A * | 7/2000 | Mortimer et al. ............ | 434/362 |
| 6,118,973 A | 9/2000 | Ho et al. ...................... | 434/236 |
| 6,120,298 A | 9/2000 | Jenkins et al. ............... | 434/362 |
| 6,154,631 A | 11/2000 | Remschel .................... | 434/350 |
| 6,160,987 A | 12/2000 | Ho et al. ...................... | 434/350 |
| 6,164,974 A | 12/2000 | Carlile et al. ................ | 434/322 |
| 6,208,832 B1 | 3/2001 | Remschel .................... | 434/350 |
| 6,212,358 B1 | 4/2001 | Ho et al. ...................... | 434/362 |
| 6,370,355 B1 * | 4/2002 | Ceretta et al. ............... | 434/350 |
| 6,470,170 B1 * | 10/2002 | Chen et al. ................... | 434/350 |

* cited by examiner

Primary Examiner—Hieu T. Vo
(74) Attorney, Agent, or Firm—Kaufman & Canoles

(57) ABSTRACT

This invention provides various systems and methods for integrating individualized, objectively managed, computer-assisted learning and directed instruction. The systems and methods of this invention utilize management information to objectively prescribe an individualized integrated instruction plan, which includes individualized computer-based instruction. The individualized computer-based instruction serves as the core means of instruction for a particular subject, effectively replacing textbooks. Initially, each individual is given a gateway test to determine whether the individual has mastered all of the elementary, foundation skills necessary in the particular subject and identify the individual's fund of knowledge in the subject. From the results of the initial test, each individual's areas of understanding and weakness are revealed. As the results of the initial, and any subsequent assessment tests are analyzed, an individual instruction plan is developed, from which lessons are generated and assigned to each individual based on what the individual has not mastered. The systems and methods of this invention also ensure that each individual receives small group instruction with an instructor in addition to the computerized instruction. Each small group is formed, or reformed, of individuals who possess similar funds of knowledge in the particular subject. User-friendly management information is a cornerstone of the objective and/or subjective decisions made in the instructional process.

26 Claims, 11 Drawing Sheets

200

| Group I | Group II | Group III |
|---|---|---|
| "Breakout" Session With Teacher | Individualized Computer Time | Individualized Computer Time |
| --------------- Tutorial Time --------------- | | |
| Individualized Computer Time | "Breakout" Session With Teacher | |
| --------------- Tutorial Time --------------- | | |
| | Individualized Computer Time | "Breakout" Session With Teacher |

|  | INITIAL ASSESSMENT | COMPUTATION AND ESTIMATION | MEASUREMENT AND GEOMETRY | NUMBERS AND NUMBER SENSE | PATTERNS | FUNCTIONS |
|---|---|---|---|---|---|---|
| Student 1 | | | | | | |
| Date Assigned | 9-15-00 | 10-6-00 | 10-16-00 | 10-17-00 | - | - |
| Lessons Not Mastered / Total Lessons | 8/30 | 7/8 | 0/11 | 15/16 | 8/8 | 23/23 |
| Date Completed | 10-5-00 | 10-15-00 | 10-16-00 | - | - | - |
| Student 2 | | | | | | |
| Date Assigned | 9-15-00 | 10-1-00 | 10-2-00 | 11-1-00 | - | - |
| Lessons Not Mastered / Total Lessons | 5/30 | 0/8 | 10/11 | 8/16 | 8/8 | 23/23 |
| Date Completed | 9-30-00 | 10-1-00 | 10-30-00 | - | - | - |
| Student 3 | | | | | | |
| Date Assigned | 9-15-00 | 10-2-00 | 10-3-00 | 10-21-00 | 11-1-00 | 10-27-00 |
| Lessons Not Mastered / Total Lessons | 12/30 | 0/8 | 9/11 | 14/16 | 7/8 | 23/23 |
| Date Completed | 10-1-00 | 10-2-00 | 10-20-00 | 10-30-00 | - | - |

CENTRAL HIGH SCHOOL

Progress Summary Report 2000-2001
9<sup>TH</sup> GRADE LEVEL ALGEBRA - MS. SMITH – 2<sup>ND</sup> PERIOD

| NAME | I/A | Sept. '01 | Oct. '01 | Nov. '01 | Dec. '01 | Jan. '02 | Feb. '02 | Mar. '01 |
|---|---|---|---|---|---|---|---|---|
| Student 1 | 3 | 8 | 8 | 9.1 | 9.3 | 9.55 | 9.6 | 9.73 |
| Student 2 | 4 | 8 | 8 | 9 | 9.3 | 9.51 | 9.6 | 9.73 |
| Student 3 | 6 | 9 | 9.15 | 9.3 | 9.39 | 9.55 | 9.69 | 9.85 |
| Student 4 | 6 | 8 | 9.3 | 9.3 | 9.6 | 9.62 | 9.77 | 9.9 |
| Student 5 | 6 | 9.175 | 9.3 | 9.3 | 9.39 | 9.39 | 9.47 | 9.6 |
| Student 6 | 5 | 9.3 | 9.3 | 9.6 | 9.77 | 9.87 | 10.3 | 10.6 |
| Student 7 | 5 | 9.35 | 9.3 | 9.6 | 9.95 | 10.35 | 10.7 | 10.9 |
| Student 8 | 5 | 9.15 | 9.3 | 9.35 | 9.62 | 9.9 | 9.98 | 9.99 |
| Student 9 | 4 | 7 | 9.05 | 9.2 | 9.3 | 9.39 | 9.39 | 9.55 |
| Student 10 | 4 | 8 | 8 | 8 | 9.1 | 9.1 | 9.1 | 9.2 |
| Student 11 | 5 | 8 | 9.15 | 9.3 | 9.35 | 9.6 | 9.6 | 9.73 |
| Student 12 | 5 | 9.025 | 9.3 | 9.47 | 9.62 | 9.95 | 9.96 | 9.99 |
| Student 13 | 4 | 8 | 8 | 8 | 9.3 | 9.51 | 9.6 | 9.73 |
| Student 14 | 4 | 8 | 9.05 | 9.3 | 9.35 | 9.47 | 9.6 | 9.73 |
| Student 15 | 5 | 8 | 9.05 | 9.3 | 9.35 | 9.51 | 9.6 | 9.73 |
| Student 16 | 6 | 9.15 | 9.3 | 9.6 | 9.9 | 10.05 | 10.2 | 10.4 |
| Student 17 | 5 | 8 | 9.15 | 9.3 | 9.6 | 9.85 | 9.95 | 9.99 |
| Student 18 | 5 | 8 | 8 | 8 | 9.1 | 9.1 | 9.2 | 9.25 |
| Student 19 | 5 | 9.125 | 9.3 | 9.51 | 9.6 | 10.15 | 10.4 | 10.7 |
| Student 20 | 6 | 9.15 | 9.3 | 9.3 | 9.35 | 9.55 | 9.6 | 9.73 |
| Student 21 | 5 | 8 | 8 | 9 | 9.2 | 9.39 | 9.55 | 9.6 |

830

Number of Students: 21
Average I/A: 4.81
Average March: 9.89
Progress: 5.08
Benchmark: 9.35

|  | B Num | Add | Sub | Mul | Div | Frac | Dec | Ratio | Geom |
|---|---|---|---|---|---|---|---|---|---|
| Student 1 | 93% | 93% | 90% | 86% | 83% | 59% | 51% | 39% | 44% |
| Student 2 | 94% | 96% | 88% | 84% | 88% | 40% | 49% | 47% | 50% |

|  | B Num | Add | Sub | Mul | Div | Frac | Dec | Ratio | Geom |
|---|---|---|---|---|---|---|---|---|---|
| High School | 90% | 94% | 91% | 87% | 81% | 62% | 50% | 32% | 40% |
| Middle School | 87% | 89% | 94% | 85% | 90% | 43% | 49% | 45% | 48% |

Fig. 10

MANAGED INTEGRATED TEACHING PROVIDING INDIVIDUALIZED INSTRUCTION

BACKGROUND OF THE INVENTION

1. Field of the Invention

This invention relates generally to systems and methods for objectively managing integrated individualized instruction.

2. Description of Related Art

Historically, the process of educating a student, and more particularly, educating a student through a public education system has been considered an art and not a science. This view has lead to the adoption of various, non-uniform standards of instruction, student evaluation, and grading. Many of the standards used in education are geographic in nature. For example, different states may have different standards for education, different school divisions within a given state may have different standards of instruction, different schools within a particular school division may have different standards of student evaluation, and different teachers within a school may have different methods of teaching and evaluating student performance. An "A" in one particular school may be equivalent to a "C" in another school. Standardized tests like the Stanford 9's or SATs have demonstrated the disparate outcomes that result from different instructional standards.

In recent years, many states have adopted specific minimum standards not only for school accreditation, but also for student competency levels, which must be met before a high school diploma can be awarded to a student. Some states, such as, for example, the Commonwealth of Virginia, have established Standards Of Learning (SOLs). These standards attempt to ensure that each student, within each grade level, has at least a basic level of understanding, or "fund of knowledge", in a core group of subject matters that is commensurate with that grade level.

Furthermore, the SOLs dictate that each student enrolled in a public school within that state, must demonstrate a basic level of competency in the determined group of subject areas before he or she can be awarded a high-school diploma from a public school within that state. This system has been established in an effort to guarantee that, for example, a student in a rural or impoverished portion of a state will not only progress through school, but will also graduate having the same basic "fund of knowledge" as a student who graduates in a more metropolitan or affluent portion of the state.

Additionally, this system attempts to ensure that each student in, for example, the eighth grade, has a similar basic "fund of knowledge". Thus, as our society becomes more mobile, if a student must transfer from one school system to another, he or she does not have to be reevaluated before entering the new school system to determine what grade level the student is performing at in the new school. A student who performs at an "eighth grade" level in a school in the eastern portion of the state will perform at an "eighth grade" level in a school in the western portion of the state.

It is currently envisioned that a SOL might be introduced on a national level that will attempt to guarantee these advantages and equalities on a nation-wide level. Thus, each student who attends or graduates from any public school in the country will have a similar, basic understanding or "fund of knowledge" with regard to certain core subject matters.

In addition, many school systems are introducing computers into the classroom. The introduction of computers into a traditional classroom setting has, essentially, two goals. First, teachers hope to help students achieve computer literacy at an early age. Second, teachers hope to give students access to the almost unlimited resources available through, for example, the Internet. Thus, students are taught the requisite skills to utilize computers as research tools and study aids. Certain computer software packages have also been developed to, for example, assist students in improving language comprehension by attempting to make learning fun and enjoyable through the use of "interactive" cartoon characters and "video game" formats.

SUMMARY OF THE INVENTION

Unfortunately, as various curriculums advance and school systems work to ensure that their type and level of student instruction imparts an appropriate "fund of knowledge" to their students, the traditional model of teaching has been maintained. Current teaching methods utilize specific course level instruction, such that, for example, every student in an Algebra I course uses the same Algebra I textbook, regardless of student proficiency. The teachers present materials and concepts in a lecture environment to a heterogeneous group of students, worksheets are assigned to the group as a whole, and the number of presentations of the material is the same to all students in the class.

If a particular student has a problem or difficulty with a particular area within a given subject, such as, for example, the concept of negative numbers or prepositional phrases, the assigned textbook for that subject does not provide additional explanation of the subject. If the teacher becomes aware of the student's struggle, he or she might not be able to explain the concept to the student in a manner that makes the concept any more clear to the struggling student. Thus, early education "potholes" in the student's fund of knowledge can remain unfilled and the student may be promoted, by virtue of age or a sufficient understanding of other topics in the subject, out of a particular grade or skill level without ever having understood a building block concept.

Additionally, known computerized educational programs, while sometimes helpful in correcting a deficiency in a student's learning, do not replace the textbook for a given course or become the primary "teacher" of the subject material. Instead, known computerized educational programs focus merely on remediating a student's deficiencies or enhancing the student's understanding in a particular subject.

Furthermore, current models used in public education systems do not provide for a direct, efficient correlation between a student's progress through a particular subject and the student's preparedness for a standardized test, such as, for example, the SOLs. Moreover, the current education models do not provide a method for assessing and monitoring the effectiveness of a particular teacher, principal, school, or school district.

Accordingly, this invention provides systems and methods for integrating individualized, computer-assisted learning and direct teacher instruction. The systems and methods of this invention utilize computer-based instruction as the core means of instruction for a particular subject, effectively replacing any textbooks.

Initially, each student is given a gateway test to determine whether the student has mastered all of the elementary, foundation skills necessary in the particular subject and identify the student's fund of knowledge in a particular subject. For example, an Algebra student must master $4^{th}$ grade "fractions" and $6^{th}$ grade "multiplying fractions" before beginning Algebra. In various exemplary embodiments, a student must achieve an 80% proficiency in a given topic before the student is considered to have mastered the concept.

From the results of the initial, gateway test, each student's areas of understanding and weakness are revealed. Once the results of the initial test are analyzed, the computer then develops an individual instruction plan, which generates and assigns lessons to each individual student based on what the student has not mastered. Each student works through assignments and lessons that are specifically tailored to remediate deficiencies the student has in the particular subject. If a student has difficulty with a particular concept, the systems and methods of this invention provide as many presentations of the material as are necessary to master the concept.

If a topic is understood, the student can demonstrate proficiency or mastery by scoring, for example, an 80% on the mastery test. Once a student shows mastery of a particular topic, the individual instruction plan advances to the next topic of remediation or instruction. Thus, as identified deficiencies are remediated and the student achieves mastery of the requisite concepts, the individual instruction plan takes the student through the particular subject, acting as both the textbook and the primary means of instruction.

According to another aspect of the invention, each student receives small group instruction with a teacher in a "breakout" session, in addition to the computerized instruction described above. Each small group is formed of students who possess similar funds of knowledge. Thus, each group represents a homogeneous academic portion of a total class. These small groups receive interactive and personalized instruction from a teacher in small group "breakout" sessions. In various exemplary embodiments, each group consists of seven or fewer students.

It should be appreciated that each breakout group may have the same teacher. Alternatively, each breakout group may have a different teacher, depending upon, for example, the subject matter being studied or the skill level represented by the group.

It should also be understood that, within each group, different students may experience difficulties with different specific portions of a curriculum. For example, one student in an algebra group may have difficulty multiplying negative numbers, while another member of the group may have difficulty calculating square roots. However, all of the students in each group have a similar, basic understanding of the core curriculum. For example, each student within the group comprehends mathematics at approximately the same level. Therefore, the Algebra breakout lessons are specifically modeled to the group's mathematics literacy level.

Teachers are guides to learning and teach lessons at an instructional level that is appropriate for all of the students in the group. The course level lessons are based primarily on the skill level at which the students in the group are working. Application and assimilation of concepts is emphasized in the breakout group as opposed to skill or drill exercises.

Thus, within each group, the teacher is able to give basic lessons that benefit each of the students in the group. For example, in a group breakout session, the teacher may introduce a new topic that each of the students in that particular group has shown an appropriate fund of knowledge or ability to understand, or the teacher may work through a real world problem, which requires a depth of understanding that all of the students in the group possess. Similar lessons or problems can be presented to each of the various groups, but each problem is presented to each group at an appropriate level of difficulty or with an appropriate number of "hints" as to put the solution of the problem within the grasp of all of the group's members.

As individual students advance through their individual instruction plan, the teacher may move the students from their current group to another, more appropriate group. As a student moves through the individual instruction plan, her or she will either catch up to more advanced groups in the software or fall behind in the coursework of the group they are currently assigned.

In various exemplary embodiments, assessment tests are given periodically, or, for example, when certain portions of the individual instruction plan are completed, to determine each student's knowledge base in a new topic. Additionally, mastery tests may be given periodically, or, for example, when certain lessons are completed, to verify and reassess each student's understanding of the particular lesson.

In various exemplary embodiments of the systems and methods of this invention, performance data is generated that not only provides teachers and students with progress reports and grades, but also provides school principals, superintendents, and boards with valuable management information. Periodic reports provide feedback regarding, for example, a student's original fund of knowledge and current progress. These reports also provide comparative data for principals to compare teacher's class compositions and class instructional progress to assure reasonable productivity and standardized testing readiness.

In various exemplary embodiments, teachers are provided with performance data in the form of class management reports that can be used to identify strengths and deficiencies within a class such that, for example the teacher can develop or modify lesson plans or "breakout maps" to maximize breakout session and/or computer lab efficiency, or re-group students for instruction. In this manner, each group of students receives an improved level of instruction (or quality of teaching) and frequency of instruction opportunities (or quantity of teaching).

In various exemplary embodiments, the management information may be used to establish a baseline that correlates to, for example, a specific (or average) class's fund of knowledge, initial assessment level, average progress level, or the like. The baseline information then affords comparison of, for example, the effectiveness of a particular teacher or principal, or the comparison of several schools within a particular area. This level of comparative management information has heretofore not been available and not only provides feedback for improvement in the teacher's teaching methods, but also provides objective data that can be utilized in the formulation of strategies for intervention and predicts outcomes to facilitate strategic decision making.

Thus, this invention provides integrated, individualized, mastery based, and tutorial supported instructional systems and methods.

The systems and methods of this invention separately provide combination of computer mastery based instruction and direct instruction by teachers.

This invention separately provides systems and methods that combine the advantages of small group instruction with the dynamic functionality of computer systems and software to improve the learning process.

This invention separately provides systems and methods that augment the role of the traditional teacher such that the teacher "teaches" in small groups that are comprised of students with a similar understanding or mastery level of a particular subject.

This invention separately provides an educational program that utilizes current and user-friendly management data to identify student needs, compare performance, and predict outcomes in a standardized test environment.

This invention separately provides systems and methods that produce improved quality control systems, teacher accountability, and comparative mastery data.

This invention separately provides systems and methods that utilizes computers for mastery based diagnosis and individualized, computerized instruction, which can support an entire curriculum.

This invention separately provides systems and methods that provide small group instruction.

This invention separately provides systems and methods that assess proficiency in a particular subject before initiating the course level instruction in that particular subject.

This invention separately provides systems and methods that remediate basic skills in a particular subject before initiating the course level instruction in that particular subject.

This invention separately provides students with an improved, recursive learning environment.

This invention separately provides systems and methods that utilize periodic testing to assess and monitor students's proficiency and preparedness for standardized assessment tests.

This invention separately provides systems and methods that assist in the professional development and training of participating teachers.

This invention separately provides systems and methods that identify deficiencies in a student's comprehension of a particular subject and provide individually tailored lessons that serve to remediate the student's understanding.

This invention separately provides systems and methods that help students develop a desired "fund of knowledge" in a particular subject area.

This invention separately provides a program structure that includes integrated software instructional paths, specific "breakout" lessons, weighted grading formulas, vocabulary quizzes, systematic progress reports, and mock standardized tests to improve program compliance, instructional consistency, and testing success.

This invention separately provides using objective management data to improve student outcomes and assist teachers in formulating appropriate intervention strategies when needed versus remediating after a student has failed to show mastery of a topic area.

These and other features and advantages of this invention are described in or are apparent from the following detailed description of the exemplary embodiments.

BRIEF DESCRIPTION OF THE DRAWINGS

The exemplary embodiments of this invention will be described in detail, with reference to the following figures, wherein like reference numerals refer to like elements throughout the several views, and wherein:

FIG. 2 shows a chart illustrating one exemplary embodiment of a class schedule using the systems and methods of this invention;

FIG. 7 shows one exemplary embodiment of a student/class progress report usable in conjunction with the systems and methods of this invention;

FIG. 8 shows one exemplary embodiment of a student/class periodic progress report usable in conjunction with the systems and methods of this invention;

FIG. 9 shows one exemplary embodiment of an assessment report 900 usable in conjunction with the systems and methods of this invention; and FIG. 10 shows one exemplary embodiment of a school assessment report 1000 usable in conjunction with the systems and methods of this invention.

DETAILED DESCRIPTION OF THE PREFERRED EMBODIMENT

For simplicity and clarification, the operating principles, design factors, and layout of the systems and methods for integrated, individualized, mastery based, and tutorial supported instruction according to this invention are explained with reference to various exemplary embodiments of the systems and methods for integrated, individualized, mastery based, and tutorial supported instruction according to this invention. The basic explanation of the operation of the systems and methods for integrated, individualized, mastery based, and tutorial supported instruction is applicable for the understanding and design of the constituent components employed in the systems and methods for integrated, individualized, mastery based, and tutorial supported instruction of this invention.

It should be understood that, although the various exemplary embodiments described herein are described with reference to instruction in the field of mathematics, this is merely for simplicity and clarification of the systems and methods of this invention. Therefore, it will be apparent to one of ordinary skill in the art that the systems and methods for integrated, individualized, mastery based, and tutorial supported instruction, according to this invention, can be used in conjunction with any subject matter and are not limited to the field of mathematics.

Figure 1A:
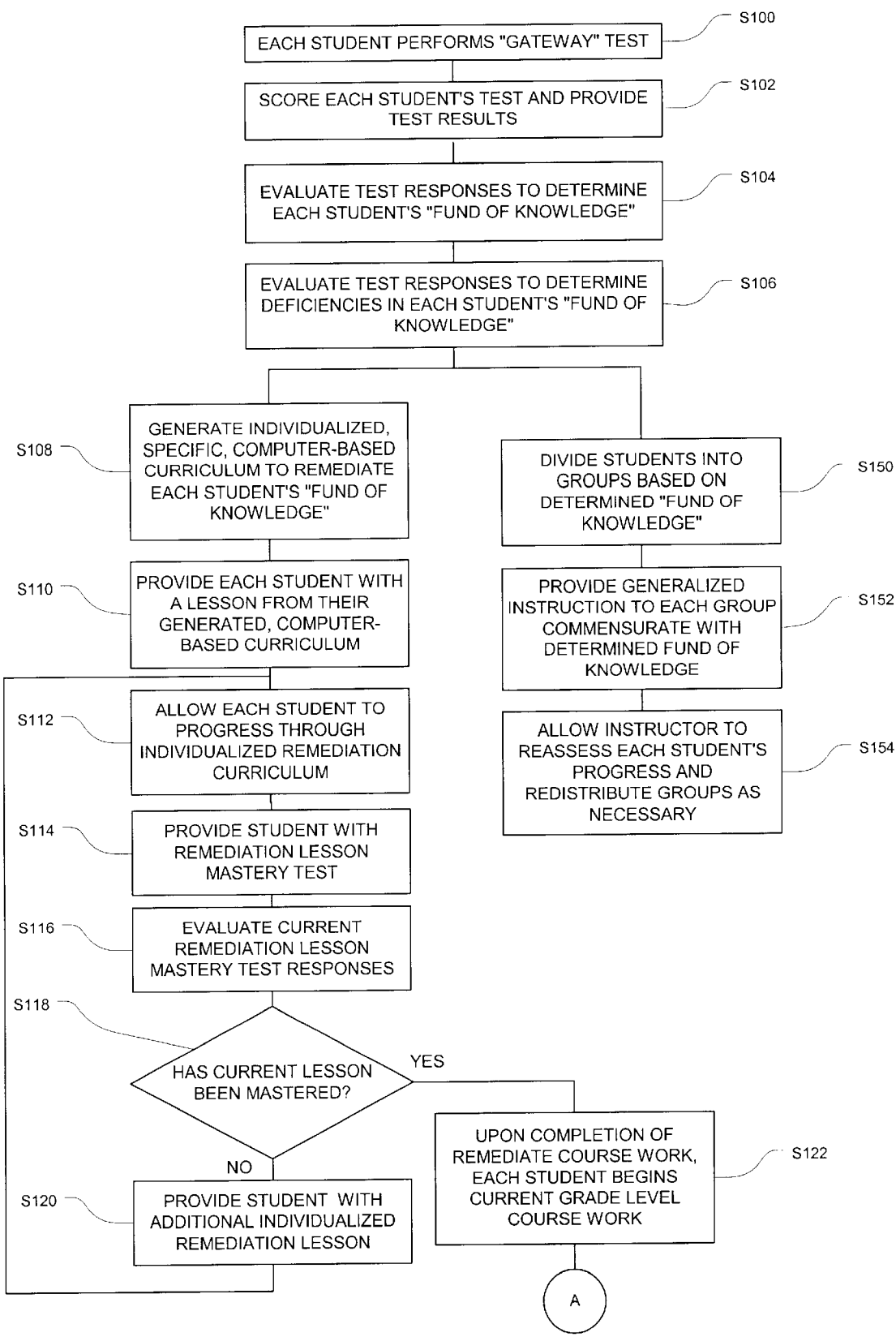
FIGS. 1A and 1B are a flowchart outlining one exemplary embodiment of a method for managed integrated teaching according to this invention.
Figure 1B:
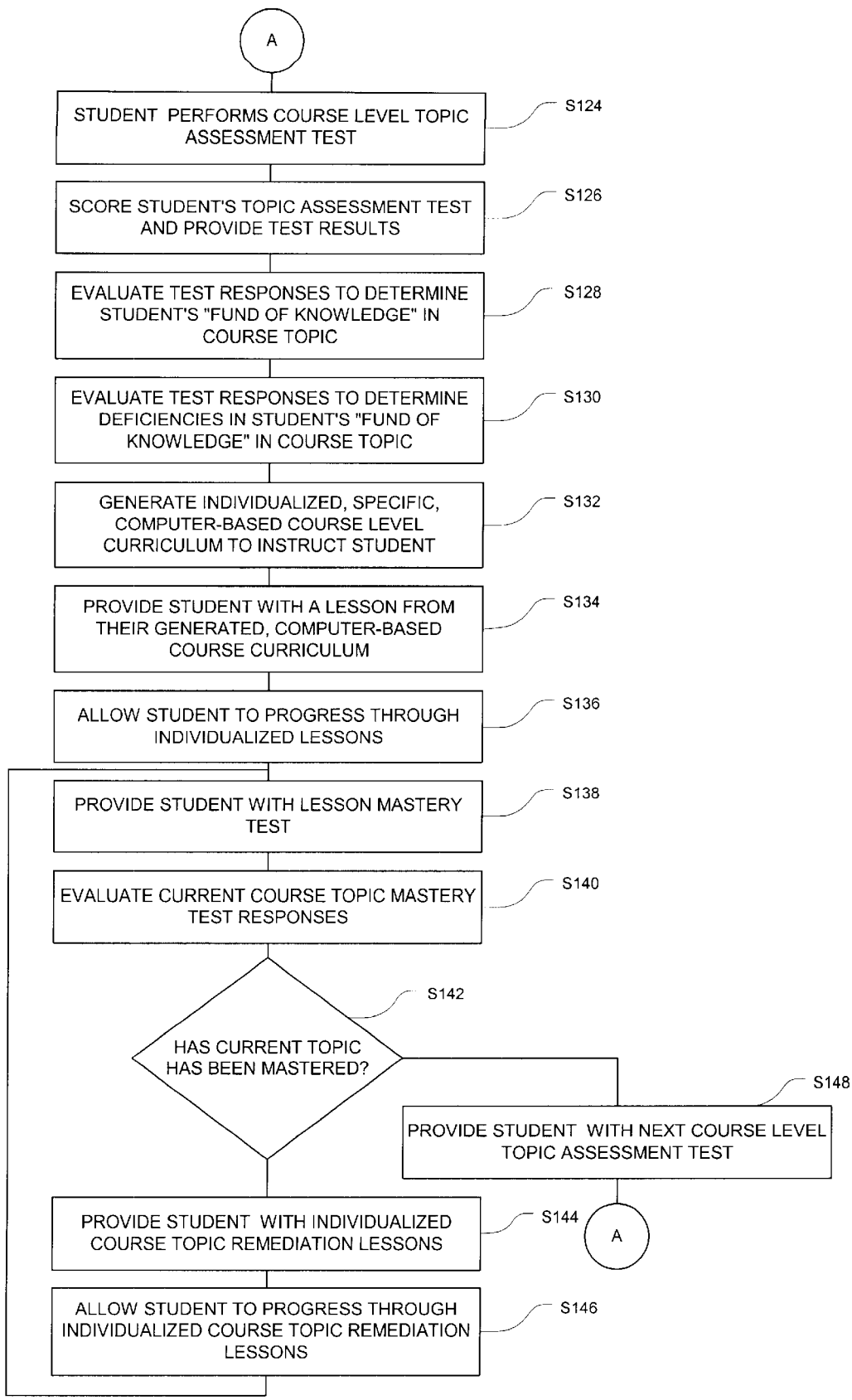

FIGS. 1A and 1B are a flowchart outlining one exemplary embodiment of a method for managed integrated teaching according to this invention. As shown in FIGS. 1A and 1B, beginning in step S100 each student completes a "gateway" test. It should be appreciated that, in various exemplary embodiments, the "gateway" test is used as a tool to determine whether a student's level of understanding, or fund of knowledge, in a particular subject. For example, if a group of students are enrolled in a ninth grade Algebra course, and are preparing to take a ninth grade algebra SOL exam, the questions in the gateway test will focus on all of the foundation skills necessary for a typical student to learn and comprehend ninth grade level Algebra.

The gateway test may include questions in broad mathematics topics such as, elementary addition and subtraction, multiplication and division, fractions, probability and statistics, computation and estimation, measurement and geometry, numbers and number sense, patterns, functions, and other algebra fundamentals. Within certain of the topics, the test may specifically focus on the students' understanding of more narrow topics, such as, for example, an understanding of the concepts of mean, median, mode, and range, matrices, the addition and subtraction of fractions, the addition and subtraction of mixed numbers, multiplying fractions, whole integers, rational numbers, percentages, calculating the perimeter or area of various shapes, polygons, ratios and proportions, to order of operations, subsets of real numbers, imaginary numbers, variables, ordered pairs, quadrants, linear equations, graphs, and the like.

Then, in step S102 each student's test is scored. In various exemplary embodiments, the raw test score may be provided to, for example, the student or the student's teacher. Next, in step S104, each student's test responses are evaluated to determine each particular student's individual "fund of knowledge" in the subject area. For example, each Algebra student's test results are analyzed to identify the background materials each student has adequately mastered. In various exemplary embodiments, each student must demonstrate an 80% proficiency in each given topic before the student is considered to have mastered that topic.

In step S106, each student's test responses are further evaluated to identify any deficiencies in each student's fund of knowledge. Deficiencies are typically areas in which each student struggles or fails to adequately comprehend the subject matter. In various exemplary embodiments, any area in which a student fails to demonstrate an 80% proficiency is considered an area in which the student fails to adequately comprehend the subject matter.

In this manner, it may be determined that a particular student has mastered all but two of the topics required as prerequisites to beginning ninth grade Algebra. Therefore, the test analysis will identify the two areas in which the student lacks a basic fund of knowledge. For example, the test analysis may identify "subsets of real numbers" and "matrices" as the two areas in which the student has a deficient fund of knowledge. In various exemplary embodiments, if, for example, "subsets of real numbers" is considered a topic that should have been mastered as part of sixth grade material, and "matrices" is considered a topic that should have been mastered as part of seventh grade material, the student is given an initial assessment score of six. This initial assessment score demonstrates that the student has a deficiency in a topic that should have been mastered as part of sixth grade material.

If, in step S106, it is determined that a student has demonstrated a fund of knowledge sufficient to begin ninth grade level Algebra, the student is given an initial assessment score of nine. This initial assessment score shows that the student has demonstrated no deficiencies in any of the topics that should have been mastered prior to beginning ninth grade level Algebra.

If, in step S106, it is determined that a student has demonstrated a mastery capability that exceeds the fund of knowledge necessary to begin ninth grade level Algebra, the student may be given an initial assessment score of between nine and ten. This initial assessment score shows that the student has demonstrated no deficiencies in any of the topics that should have been mastered prior to beginning ninth grade level Algebra and actually has an understanding of topics that are to be mastered as part of the ninth grade level Algebra curriculum.

In step S108, an individualized, specific computer-based curriculum is generated for each student. Each individual curriculum, or individual instruction plan, includes specific course work, in the form of individual lessons, which are designed to cover areas in which the student has demonstrated a deficient fund of knowledge. For example, if the student failed to master "subsets of real numbers" and "matrices", the student's individual instruction plan would at least include, and may exclusively include, lessons designed to remediate the student's deficiencies in these two areas.

In step S110, each student is provided with at least one individualized lesson, as prescribed by the student's individual instruction plan. Then, in step S112, each student is allowed to progress through the remediation portion (if necessary) of his or her individual instruction plan curriculum.

In step S114, as a student completes a given lesson in his or her remediation plan, the student is provided with a remediation lesson mastery test to determine whether the remediation lesson has adequately remediated the student's particular deficiency. In step S116, the responses to the remediation lesson mastery test are evaluated and, in step S118, a determination is made as to whether the current remediation lesson material has been mastered by the student.

If, in step S118, it is determined that the student has not mastered the remediation lesson material (by, for example failing to answer at least 21% of the questions on the remediation lesson mastery test correctly), the method advances to step S120 and the student is provided with at least one additional remediation lesson that covers the same material as the remediation lesson that was tested. The method then returns to step S112, where the student is allowed to progress through the at least one additional remediation lesson.

If, in step S118, it is determined that the student has mastered the remediation lesson material (by, for example, correctly answering at least 80% of the questions on the remediation lesson mastery test), the method either returns to step S110 where the student is presented with a next individualized lesson (if necessary), based on the student's determined individual instruction plan, or jumps to step S122.

In various exemplary embodiments, as each student is presented with a new lesson for remediation, the student may choose to perform the mastery test for that lesson, prior to beginning the lesson. If the student so chooses, and the student demonstrates mastery of the material covered in the remediation lesson, the student is able to progress to the next lesson. If the student performs the mastery test for that lesson, and fails to demonstrate mastery of the material covered in the remediation lesson, the student must begin the remediation lesson. The option of performing the mastery test for a given remediation lesson may be presented to the student at various points during completion of the remediation lesson.

It should be appreciated that, in the example given above, as the student with the initial assessment of six completes the remedial work required to master "subsets of real numbers", the student's initial assessment is changed from a six (showing a deficiency in a sixth grade level subject) to a seven (showing a current deficiency in a sixth grade level subject), and the students lessons focus on remediation of "matrices".

When the student completes the remedial work required to master "matrices", the student's assessment is changed from a seven (showing a deficiency in a seventh grade level subject) to a nine (showing a current ability to begin the ninth grade level Algebra course work).

In accordance with each student's individual instruction plan, as each student completes all of the remediation lessons and/or associated mastery tests necessary to demonstrate remediation of any determined deficiencies, the student advances to step S122 and begins the current grade level course work, for example, the ninth grade level Algebra course work.

It should be appreciated that, as each student will have different areas of deficiency, each student, while attending the same class, for example the same Algebra class, may, at any given time, be working on a lesson that is distinct from any other student in the class. Additionally, as the method described herein is individualized, each student may begin the current grade level course work, for example, the ninth grade level Algebra course work at a different time.

In step S124, as each student begins the course level curriculum, he or she is provided with and performs a course topic assessment test. The course topic assessment test tests the student's fund of knowledge with regard to a first topic to be covered by the course material. For example, in an Algebra course, the first course topic assessment test may test the student's fund of knowledge regarding the first Algebra topic of "equations and inequalities".

Then, in step S126, the student's course topic assessment test is scored. In various exemplary embodiments, the raw test score may be provided to, for example, the student or the student's teacher. Next, in step S128, the student's course topic assessment test responses are evaluated to determine his or her individual "fund of knowledge" in the subject area. For example, the student's course topic assessment test results are analyzed to whether the student has the ability to comprehend and begin working with the new concepts of "equations and inequalities".

In step S130, the student's course topic assessment test responses are further evaluated to identify any deficiencies in the student's fund of knowledge in that topic. For example, the student's course topic assessment test results are analyzed to determine whether the student has already mastered "equations and inequalities". Typically, as the course topic assessment test tests the student on subject matter that he or she has not already been taught, the course topic assessment test results will show a large number of deficiencies in the topic.

If, in step S130, it is determined that a student has demonstrated a mastery of the first course topic, the student is given a course topic assessment test for the next course topic. If, in step S130, it is determined that a student has deficiencies in the tested course topic, the method advances to step S132, where an individualized, specific computer-based course topic curriculum is generated for each student. Each individual course topic curriculum, or individual course topic instruction plan, includes specific course topic work, in the form of individual lessons, which are designed to cover areas in which the student has demonstrated a deficient fund of knowledge.

In step S134, the student is provided with at least one individualized course topic lesson, based on the student's determined individual course topic instruction plan. Then, in step S136, the student is allowed to progress through the course topic lesson of his or her individual course topic instruction plan curriculum.

In step S138, as a student completes a given course topic lesson, the student is provided with a course topic lesson mastery test to determine whether the student has understood and comprehended the course topic. In step S140, the responses to the course topic lesson mastery test are evaluated and, in step S142, a determination is made as to whether the current course topic lesson material has been mastered by the student.

If, in step S142, it is determined that the student has not mastered the course topic lesson material (by, for example failing to answer at least 21% of the questions on the course topic lesson mastery test correctly), the method advances to step S144 and the student is provided with at least one individualized, remediation lesson that covers the course topic material. Then, in step S146, the student is allowed to progress through the at least one course topic remediation lesson.

If, in step S142, it is determined that the student has mastered the course topic lesson material (by, for example, correctly answering at least 80% of the questions on the course topic lesson mastery test), the method jumps to step S148 where the student is presented with the next course topic assessment test (as long as there is a subsequent course topic, else this portion of the method ends). The method then returns to step S124 where the student is provided with and performs a course topic assessment test for the next course topic.

It should be appreciated that steps S108 through S110 are being performed substantially concurrently with steps S150 through S154.

In step S150, which occurs substantially concurrently with step S108, the students are divided into groups based on their determined fund of knowledge, as described above. In various exemplary embodiments, each group consists of approximately seven or fewer students. In this manner, the groups are small enough that individualized instruction from a teacher and effective interaction can occur.

In step S152, each group is provided with periodic, generalized instruction that is commensurate with the group's determined fund of knowledge. In various exemplary embodiments, the generalized instruction given to the students is instruction provided to the teacher as part of a lesson plan, or "breakout map", similar to the individualized, specific computer-based curriculum is provided for each student. It should be appreciated that, the instruction plan can be in the form of a scripted text, an outline of a lesson, or a general topic outline. The teacher then covers the material with the group as outlined in the breakout maps. In various exemplary embodiments, the generalized instruction is give to the students of each group on a biweekly basis.

Optionally, in step S154, the group teacher may periodically reassess each student's progress or course level and redistribute the students within the various the groups as necessary to maximize group dynamics and effectiveness.

It should be appreciated that the steps outlined above, and specifically steps S150 to S154, may be repeated as needed until, for example, the students demonstrate mastery of the current subject material or a particular time period, such as a school semester, is completed.

FIG. 2 shows a chart illustrating one exemplary embodiment of a class schedule 200 using the systems and methods of this invention. As illustrated in FIG. 2, and in accordance with the methods described herein, an exemplary class is divided into three groups. If, for example, the class period is ninety minutes in duration, the class period may be divided into three separate time periods, for example, twenty minute time periods. The additional thirty minutes may then be divided, for example, into two fifteen minute time periods that can be used as tutorial time for the teacher to work with individual students outside of a group setting. In various exemplary embodiments, the time periods may be of unequal length as determined by the group teacher. Alternatively, each group may meet with the teacher on a periodic basis.

As illustrated in FIG. 2, each group is allowed to meet with the teacher for one period, or breakout session, during the class. While the members of each group are awaiting their breakout session, the members perform their lessons in accordance with each student's individual instruction plan, as outlined and described herein.

In various exemplary embodiments of the systems and methods of this invention, while the students are performing their individualized computer lessons, they are being monitored by a lab manager.

Figure 3:
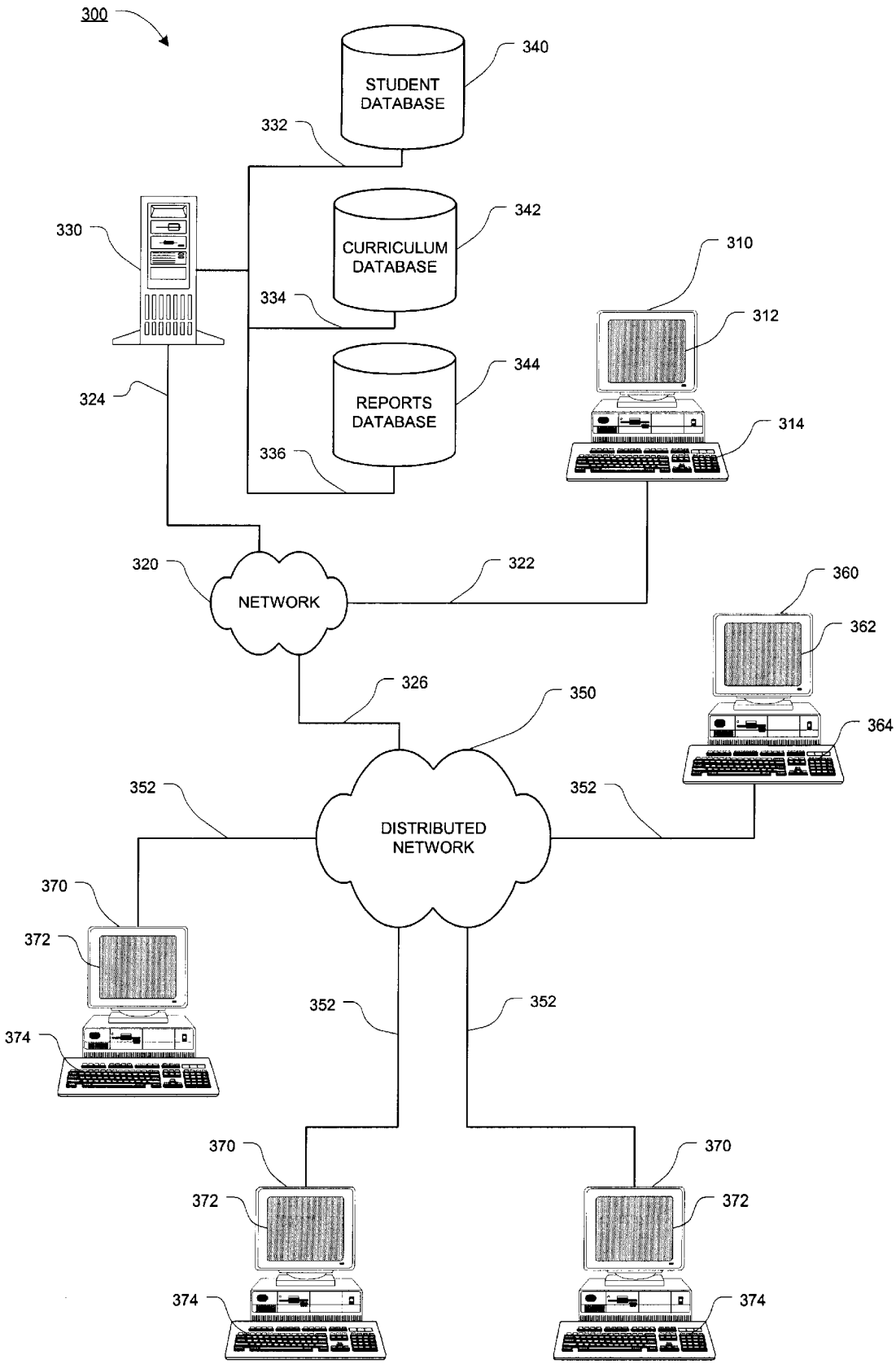
FIG. 3 is a functional block diagram outlining a first exemplary embodiment of an integrated, individualized, mastery based, and tutorial supported instruction system according to this invention.

FIG. 3 is a functional block diagram outlining a first exemplary embodiment of an integrated, individualized, mastery based, and tutorial supported instruction system 300 according to this invention. As shown in FIG. 3, the system for providing integrated, individualized, mastery based, and tutorial supported instruction 300 includes at least some of a central management computer 310, a server 330, a central lab computer 360, and at least one student computer 370. In various exemplary embodiments, the system 300 includes a plurality of student computers 370. Each computer 310, 360, and 370 is linked, either directly or indirectly, to a distributed network 350, and, in turn, to a server 330, via a network 320.

In various exemplary embodiments, the distributed network 350 and/or the network 320 is, for example, an intranet, an extranet, the Internet and, more particularly, the World Wide Web portion of the Internet, a Local Area Network (LAN), a Wide Area Network (WAN), or any other presently known or later developed distributed network. It should be appreciated that, in various exemplary embodiments, the distributed network 350 and the network 320 may be the same network. Alternatively, the network 320 may be, for example, a particular node, such as, for example, a specific web page, of the distributed network 350.

In various exemplary embodiments, each of the computers 310, 360, and 370, is typically a personal computer, such as a Windows-based workstation, having a memory containing communications software and some form of Internet connectivity, such as a modem, a T-1 line, an Integrated Services Digital Network (ISDN) line, or the like. The communications software may be any software suitable for telecommunications, and preferably includes Internet browser software. The Internet connector may be used with the communications software for communication, via the distributed network 350, with the network 320, and more specifically, the server 330.

It should be understood that at least one of the computers 310, 360, and 370 may be a commercially available "Web-TV" device, such as those currently available from Phillips Electronics, Magnavox and Sony Corporation. Alternatively, at least one of the computers 310, 360, and 370 may be Network Computer, such as those currently provided by Oracle and Microsoft.

In various exemplary embodiments, each of the computers 310, 360, and 370 also includes a display 312, 362, and 372, respectively, and one or more interactive devices 314, 364, and 374, respectively. In various exemplary embodiments, the display 312, 362, or 372 can be a cathode ray tube display, a liquid crystal display, or any other known or later developed system capable of displaying data. The one or more input devices 314, 364, or 374 can be one or more of a keyboard, a mouse, a touch screen, a touch pad, a stylus, a microphone, or any other known or later developed device capable of inputting data into the computers 310, 360, and 370.

In various exemplary embodiments, the server 330 is a programmed network server, and, more specifically, a server that supports a HyperText Transfer Protocol (http). The server 330 is capable of handling requests for records, documents, and other services, and transmitting such information, via the network 320 and/or the distributed network 350, to an appropriate computer 310, 360, or 370. Many suitable software programs for interfacing the server 330 with the network 320 and/or the distributed network 350 exist, including, for example, Netscape, Apache, Microsoft IIS, and O'Reilly.

The server 330 is connected, via linked connections 332, 334, and 336, to a student database 340, a curriculum database 342, and a reports database 344, respectively. The student database 334 contains a plurality of records.

In various exemplary embodiments, the records contained by the student database 334 comprises both static and dynamic information regarding each of a plurality of students. In various exemplary embodiments, the static information includes, for example, each student's name, age, current grade level, teacher's name, parents's or legal guardian's name, mailing address, telephone number, special needs, and the like. It should be appreciated that the type and level of static student information in the student database 334 may vary and may be updated periodically, as appropriate or necessary.

In various exemplary embodiments, the dynamic information includes, for example, each student's individual instruction plan, fund of knowledge assessment, current curriculum level, current breakout group assignment, number of absences from class, additional notes from the teacher, and the like. It should be appreciated that the type and level of dynamic student information in the student database 334 may also vary, but is typically updated more frequently than the static student information.

The curriculum database 338 includes various suitable software programs for generating gateway and progress tests, evaluating student test scores, assessing a student's fund of knowledge, developing individual instruction plan, generating individualized assignments, and the like. Optionally, the curriculum database 338 also includes various suitable software programs for generating lesson plans or outlines for the group teacher to follow during the group breakout sessions, as described herein. In various exemplary embodiments, these software programs may include, for example, various instructional programs from A+ Software or Plato Software.

The reports database 344 includes various suitable software programs for receiving input testing and/or assignment results and producing performance data in the form of individual grades, progress reports, report cards, and the like. The reports database 344 also includes various suitable software programs for converting performance data into reports, such as, for example, status updates and progress reports, for teachers, parents, principals, superintendents, and school boards.

As shown in FIG. 3, the student database 340, the curriculum database 338, and the reports database 344 can be implemented, individually, separately, or as complimentary components, using any appropriate combination of alterable, volatile, non-volatile, non-alterable, or fixed, memory. The alterable memory, whether volatile or non-volatile, can be implemented using any one or more of non-selectable or dynamic RAM, a floppy disk and disk drive, a writable or re-rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

In various exemplary embodiments, the student database 340, the curriculum database 338, and/or the reports database 344 store software and data used by the integrated, individualized, mastery based, and tutorial supported instruction system 300. For example, the student database 340 may store information regarding each individual student, as described herein. The curriculum database 338 may store curriculum information regarding the gateway test(s), the individualized lessons, and/or the lesson plans, as described herein. Additionally, the reports database 344 may store information regarding various styles and types of reports, as described herein.

The server 330 manages reading data from and writing data to the student database 340, the curriculum database 338, and/or the reports database 344. The server 330 also drives the transmission of data to and the reception of data from each of the computers 310, 360, and 370.

Thus, in various exemplary embodiments, each of the computers 310, 360, and 370 is able to access, store, retrieve, and process information from any one or more of the student database 340, the curriculum database 338, the reports database 344, the distributed network 350 and/or the network 320. In this manner, it is not essential that the student, curriculum, or reports information be stored in the student database 340, the curriculum database 338, or the reports database 344. Alternatively, this information can be stored in, for example, the central management computer 310, the central lab computer 360, the server 330, the distributed network 350, and/or the network 320.

In various exemplary embodiments, the integrated, individualized, mastery based, and tutorial supported instruction system 300 will include software executing on the server 330. It should be appreciated that any other known or later developed system capable of processing and outputting data could be used in place of the server 330.

In the various exemplary embodiments described herein, the central management computer 310 interfaces, for example, with the network 320, via a linked connection 322, the network 320 interfaces, for example, with the server 330, via a linked connection 324, the network 320 interfaces, for example, with the student database 340, the curriculum database 342, and the reports database 344, via linked connections 332, 334, and 336 respectively, the distributed network 350 interfaces, for example, with the network 350, via a linked connection 326, and the central lab computer 360 and the student computers 370 interface, for example, with the distributed network 350, via linked connections 352.

The linked connections 322, 324, 326, 332, 334, 336, and/or 352 can be any known or later developed device or system for connecting any of the computers 310, 360, and 370, the network 320, the server 330, the student database 340, the curriculum database 342, the reports database 344, and/or the distributed network 350, including a direct wired connection, a connection over a LAN, a WAN, or any other distributed network, a connection over the public switched telephone network, a connection over a coaxial cable (i.e., CATV) system, a connection over a cellular telephone network, a satellite connection or the like. In general, the linked connections 322, 324, 326, 332, 334, 336, and/or 352 can be any known or later developed connection system or structure usable to connect any of the computers 310, 360, and 370, the network 320, the server 330, the student database 340, the curriculum database 342, the reports database 344, and/or the distributed network 350, including both wired and wireless connections.

Figure 4A:
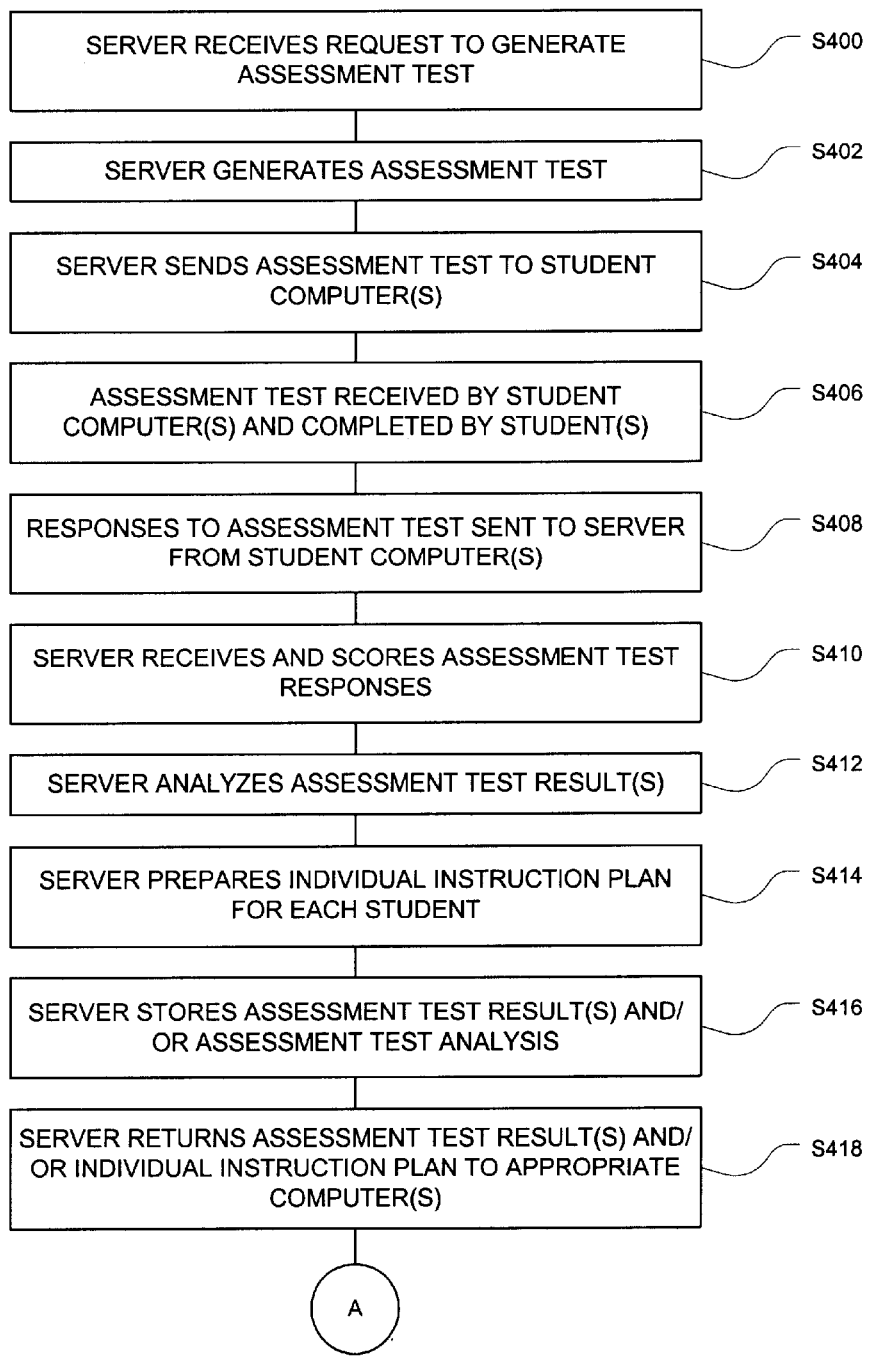
FIGS. 4A and 4B are a flowchart outlining one exemplary embodiment of a method for managed integrated teaching utilizing the integrated, individualized, mastery based, and tutorial supported instruction system according to this invention.
Figure 4B:
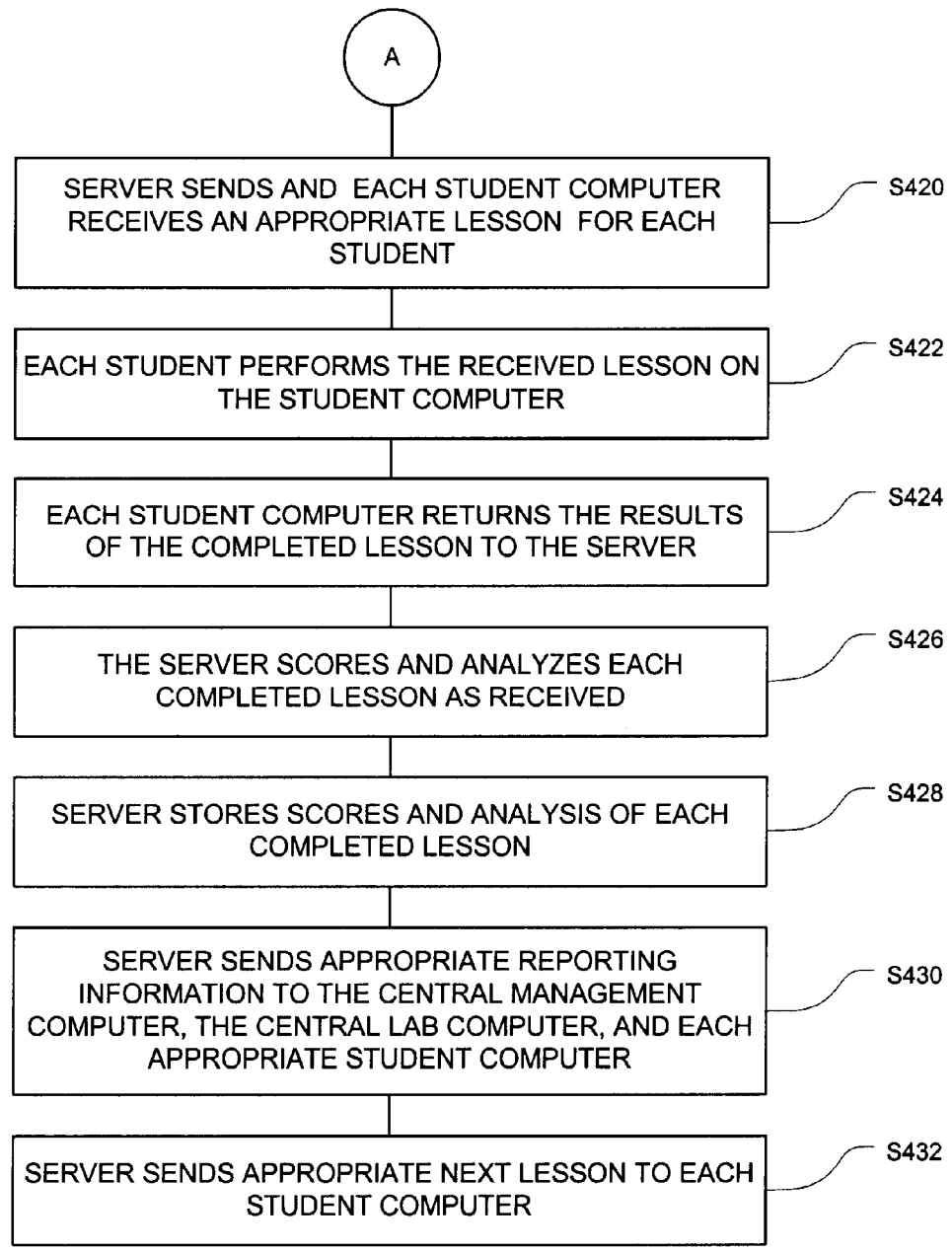

FIGS. 4A and 4B show a flowchart outlining one exemplary embodiment of a method for managed integrated teaching utilizing the integrated, individualized, mastery based, and tutorial supported instruction system 300. As shown in FIGS. 4A and 4B, beginning in step S400, the server 330 receives, via the distributed network 350 and/or the network 320, a request from either the central management computer 310, the central lab computer 360, or at least one of the student computers 370 to generate at least one assessment test. It should be understood that in various exemplary embodiments, the server 330 may only respond to a request from, for example, the central management computer 310 or the central lab computer 360. Furthermore, it should be appreciated that the request may be for a single assessment test to ascertain a single student's fund of knowledge in a particular subject. Alternatively, the request may be for a assessment test that can be used to ascertain the fund of knowledge possessed by a plurality of students in a particular subject, in, for example, a particular class. Furthermore, it should be appreciated that, with reference to FIGS. 4A and 4B, the term "assessment test" is used merely for simplicity and clarification of the systems and methods of this invention. Therefore, it should be appreciated that the methods outlined in FIGS. 4A and 4B may be used with any type or level of assessment test, including, but not limited to a gateway test, an initial assessment test, a topic assessment test, and/or a mastery test.

In step S402, in response to the request, the server 330 accesses, for example, the curriculum database 342 and retrieves or generates an appropriate assessment test. Then, in step S404, the server sends, via the distributed network 350 and/or the network 320, the generated assessment test to each of the student computers 370 as requested.

In step S406, a copy of the assessment test is received by each student computer 370 and each student completes the test as instructed. In various exemplary embodiments, each student must verify certain information, such as, for example, his or her name, identification number, or the like, before beginning the assessment test so that the integrated, individualized, mastery based, and tutorial supported instruction system 300 can identify and track each student.

Next, in step S408, each student's responses to the assessment test are sent, via the distributed network 350 and/or the network 320, to the server 330 from each student's student computer 370. It should be appreciated that, in various exemplary embodiments, each student computer 370 stores each student's response to each question in the assessment test until, for example, the entire assessment test is completed or a determined time period for completion of the assessment test has expired. Then, once the entire assessment test is completed or time has expired, all of the student's responses to the assessment test are sent to the s. Alternatively, each student computer 370 may send each student's response to each question in the assessment test as a response is entered. In various exemplary embodiments, each student's response to each question in the assessment test is initially sent to the central lab computer 360 to be stored until, for example, all of the students have completed the assessment test or a determined time period for completion of the assessment test has expired. Then, when all of the students have completed the assessment test or time has expired, all of the student's responses are sent from the central lab computer 360 to the s.

In step S410, the server 330 receives each student's responses to the assessment test and scores each student's assessment test responses against the correct responses, as stored, for example, in the curriculum database 342. Then, in step S412, the server individually analyzes each response that each student gave to each assessment test question. Based on this analysis, the server, through software stored in the curriculum database 342, determines each student's fund of knowledge and area(s) of deficiency in the subject area tested, as further described herein. Based on the fund of knowledge determination, an individual assessment number is generated for each student.

In step S414, the server 330 prepares, based on each student's fund of knowledge and area(s) of deficiency, an individual instruction plan for each student, as described herein. The curriculum of each individual instruction plan may include lessons, as necessary, to remediate any deficiencies the student demonstrated in the particular subject, and/or teach the student the subject.

Next, in step S416, the server 330 stores each student's test results, including, for example, information regarding each student's assessment test score, fund of knowledge assessment, area(s) of deficiency assessment, and/or individual instruction plan in the student database 340 and/or the reports database 344. Then, in step S418, the server 330 returns, via the distributed network 350 and/or the network 320, at least a portion of each student's test result information to an appropriate computer as an individual instruction plan. In various exemplary embodiments, the test result information is returned in a format retrieved from the reports database 344. In various exemplary embodiments, the test result information is only returned to the central management computer 310. Alternatively, determined portions of the test result information are returned to each of the central management computer 310, the central lab computer 360, and the student's student computer 370.

In step S420, the server 330 then sends, and each student computer 370 receives, via the distributed network 350 and/or the network 320, an appropriate lesson, as determined in step S414. Then, in step S422, each student performs the received lesson on his or her individual student computer 370. As each student completes a lesson on his or her student computer 370, their student computer 370, in step S424, returns the results of the completed lesson to the s, via the distributed network 350 and/or the network 320. It should be appreciated that, each student may complete his or her individualized lesson at a different time. Therefore, step S424 may occur at different times for each student and each of the student computers 370.

It should be appreciated that, in various exemplary embodiments, each student computer 370 stores each student's response to each question in each lesson until, for example, the entire lesson is completed or a determined time period for completion of the current lesson has expired. Then, once the entire lesson is completed or the time has expired, all of the student's responses to the completed lesson are sent to the s. Alternatively, each student computer 370 may send each student's response to each question as a response is entered. In various exemplary embodiments, each student's response to each question in each lesson is initially sent to the central lab computer 360 to be stored until, for example, all of the students have completed a current lesson or a determined time period for completion of the current lesson has expired. Then, when all of the students have completed their current lesson or time has expired, all of the student's responses are sent from the central lab computer 360 to the s.

As the server receives, via the distributed network 350 and/or the network 320, the results of a completed lesson, the method advances to step S426, and the server scores each student's completed lesson responses against the correct responses, as stored, for example, in the curriculum database 342. Based on the score each student receives for a completed lesson, the server 330 determines, based on a predetermined pass rate, such as, for example 80% correct responses, whether each student has mastered the material presented in the completed lesson.

It should be appreciated that, if, for example, the server 330 receives responses to the lesson questions as the responses are entered, a student may reach the predetermined pass rate, for example the 80% correct responses, demonstrating mastery of the lesson material, before the entire lesson is completed. In this situation, a student may be credited with completion of the lesson without performing the entire lesson.

Next, in step S428, the server 330 stores each student's lesson score, in the student database 340 and/or the reports database 344. Then, in step S430, the server 330 returns, via the distributed network 350 and/or the network 320, at least a portion of each lesson score information to an appropriate computer as a report. In various exemplary embodiments, the lesson score information is returned in a format retrieved from the reports database 344. In various exemplary embodiments, the lesson score information is only returned to the central management computer 310. Alternatively, determined portions of the lesson score information are returned to each of the central management computer 310, the central lab computer 360, and each of the student computers 370.

In step S432, the server 330 sends, and each appropriate student computer 370 receives, via the distributed network 350 and/or the network 320, an appropriate next lesson to each student. If, in step S426, the student demonstrated mastery of the lesson material, the student receives the next lesson according to his or her determined individual instruction plan. If, in step S426, the student failed to demonstrate mastery of the lesson material, the student receives a revised version of the lesson. It should be appreciated that the curriculum database 342 includes sufficient resource material to provide requisite lessons to each student.

It should be appreciated that the steps outlined above may be repeated as needed until, for example, the students demonstrate mastery of the subject material or a particular time period, such as a school semester, is completed.

Figure 5:
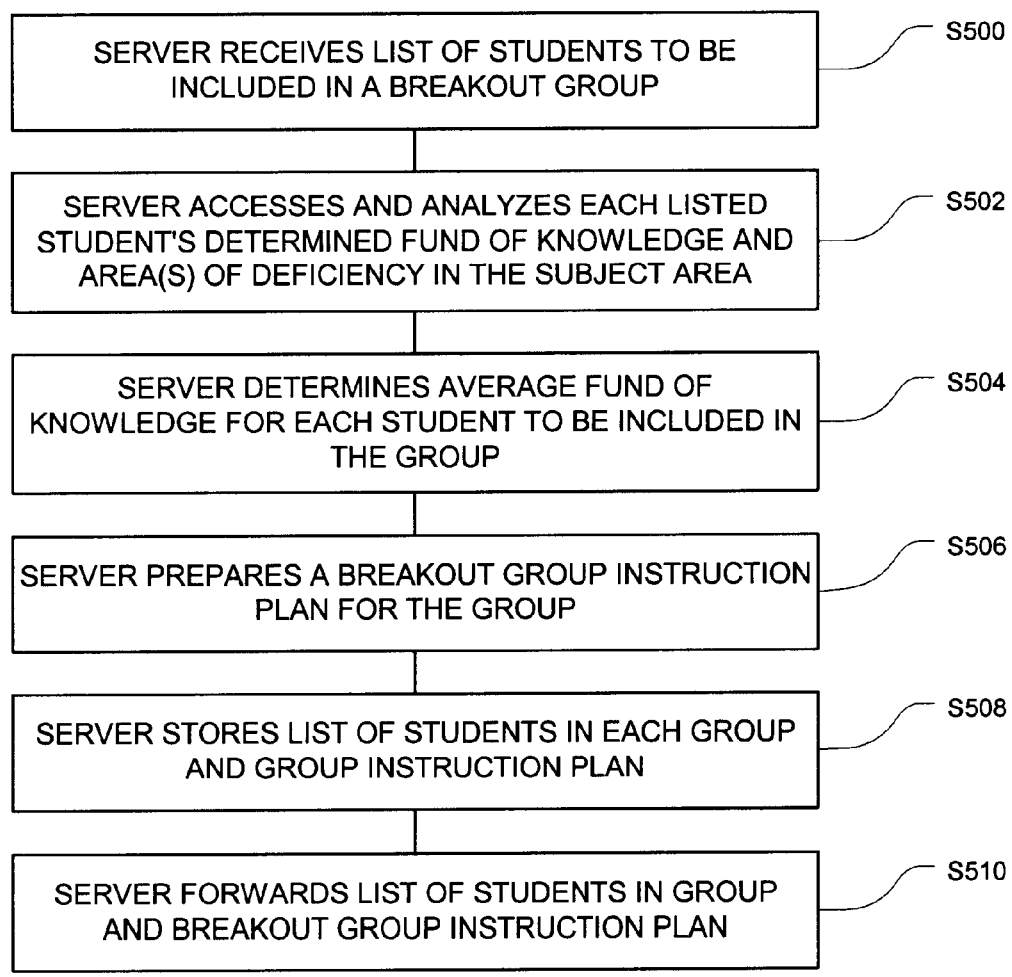
FIG. 5 is a flowchart outlining one exemplary embodiment of optional steps usable in conjunction with the flowchart of FIGS. 4A and 4B.

FIG. 5 is a flowchart outlining one exemplary embodiment of optional steps for grouping students based on a similar fund of knowledge and/or providing an appropriate group curriculum for designated student groups. As shown in FIG. 5, beginning in step S500, the server 330 receives, via the distributed network 350 and/or the network 320, a list, from the central management computer 310 or the central lab computer 360, including the names of students who are to be included in a breakout group. The students to be included in the breakout group typically possess an approximately equivalent fund of knowledge, as determined, for example, by the students's teacher, in the particular subject area being taught.

In step S502, in response to the received list of students, the server 330 accesses, for example, the student database 340, and analyzes each listed student's determined fund of knowledge and/or area(s) of deficiency in the subject area (as determined, for example in step S412, above). Then, in step S504, the server determines an average fund of knowledge for each student to be included in the breakout group.

In step S506, the server 330 prepares, based on the determined average fund of knowledge for each student to be included in the breakout group, a breakout group instruction plan for the group, as described herein.

Optionally, in step S508, the server 330 stores the list of students in each group and the breakout group instruction plan in, for example, the student database 340. Then, in step S510, the server 330 forwards, via the distributed network 350 and/or the network 320, a list confirming the composition of each group and at least a portion of the breakout group instruction plan to an appropriate computer. In various exemplary embodiments, the breakout group instruction plan information is returned in a format retrieved from the reports database 344. In various exemplary embodiments, the breakout group instruction plan information is only returned to the central management computer 310 and/or the central lab computer 360.

In this manner, the teacher receives a list confirming the composition of each group and a breakout group instruction plan for each breakout group.

Figure 6:
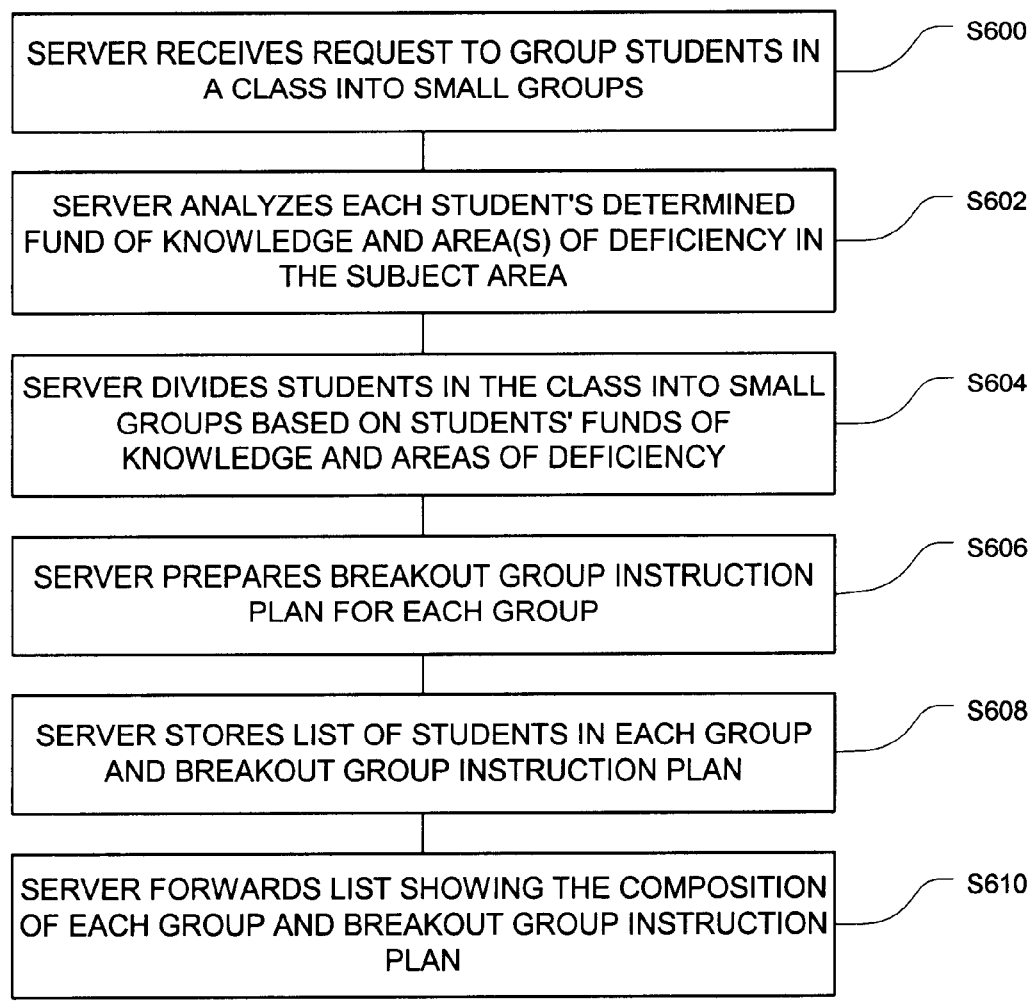
FIG. 6 is a flowchart outlining another exemplary embodiment of optional steps usable in conjunction with the flowchart of FIGS. 4A and 4B.

FIG. 6 is a flowchart outlining another exemplary embodiment of optional steps for grouping students based on a similar fund of knowledge and/or providing an appropriate group curriculum for designated student groups. As shown in FIG. 6, beginning in step S600, the server 330 receives, via the distributed network 350 and/or the network 320, a request to group all of the students in a given class into small groups, wherein each student in the group possesses a relatively similar fund of knowledge and area(s) of deficiency in the subject area being taught. The request may include restrictions as to the total number of groups or the maximum size of each group.

In step S602, in response to the request, the server 330 accesses, for example, the student database 340, and analyzes each student's determined fund of knowledge and/or area(s) of deficiency in the subject area (as determined, for example in step S412, above). Then, in step S604, the server divides all of the students in the class into small groups based on the students's determined funds of knowledge and areas of deficiency in the subject area, as requested, and determines an average fund of knowledge for each group.

In step S606, the server 330 prepares, based on the determined average fund of knowledge for each group, a breakout group instruction plan for each group, as described herein.

Optionally, in step S608, the server 330 stores the list of students in each group and the breakout group instruction plan in, for example, the student database 340. Then, in step S610, the server 330 forwards, via the distributed network 350 and/or the network 320, a list showing the composition of each group and at least a portion of the breakout group instruction plan to an appropriate computer. In various exemplary embodiments, the information is returned in a format retrieved from the reports database 344. In various exemplary embodiments, the information is only returned to the central management computer 310 and/or the central lab computer 360.

In this manner, the teacher receives a list showing the composition of each group and a breakout group instruction plan for each breakout group.

FIG. 7 shows one exemplary embodiment of a student/class progress report 700 usable in conjunction with the systems and methods of this invention. As shown in FIG. 7, the progress report 700 includes information regarding the progress of each student from the time of initial assessment (gateway test), through the main topics of a particular course. It should be appreciated that each course may be divided into main course topics, each containing a number of lessons that must be mastered by the students.

More specifically, the progress report 700 shows information regarding the progress of three students in a ninth grade level Algebra course. For this example, an initial, gateway test was given Sep. 15, 2000. As shown in the progress report 700, Student 1 failed to demonstrate mastery in eight of the thirty topics covered by the gateway test. Therefore, on September 15, Student 1 was assigned remediation lessons, as described herein, in the at least one sub-topic in which he failed to demonstrate mastery on the September 15 gateway test. According to the progress report 700, Student 1 completed the necessary remediation lessons and/or demonstrated mastery in the eight sub-topics on October 5.

On October 6, Student 1 performed the first course topic assessment test for the "computation and estimation" materials. The results of the "computation and estimation" course topic assessment test showed that Student 1 initially mastered the materials for one of the eight lessons in that topic. By October 15, Student 1 completed the seven lessons that he did not initially test out of and demonstrated mastery of all eight of the topics by successfully completing the requisite course topic mastery test, as described herein.

According to the progress report 700, on October 16, Student 1 performed a course topic assessment test for the "measurement and geometry" materials and successfully tested out of that course topic. Thus, on October 17, Student 1 performed a course topic assessment test for the next course topic, "numbers and number sense" without doing any lessons on the course topic "measurement and geometry".

The progress report 700 also shows that the results of the "numbers and number sense" course topic assessment test revealed that Student 1 initially mastered the materials for one of the sixteen lessons in that topic. As of the date of the progress report 700, Student 1 was working through the fifteen lessons that he did not initially test out of on October 17.

As of the date of the progress report 700, Student 1 had not yet begun the course work associated with the "patterns" or "functions" materials as it is necessary, according to the progress report 700, to master the "numbers and number sense" topic before beginning the course work in the "patterns" and "functions" materials.

FIG. 8 shows one exemplary embodiment of a student/class periodic progress report 800 usable in conjunction with the systems and methods of this invention. As shown in FIG. 8, the periodic progress report 800 includes at least some of a heading portion 810, a body portion 820, and a summary portion 830.

The heading portion 810 includes information necessary to identify at least some of the school, course, teacher, and class. The body portion 820 includes a list of each of the students in the designated class. The body portion 820 also includes information regarding each student's initial assessment as well as each student's progress through his or her individual instruction plan.

The summary portion 830 includes information regarding the entire class such as, for example, the number of students in the class, the average initial assessment for the students in the class, the average current assessment for the students in the class, the average progress demonstrated by the students in the class, and a benchmark, or goal, for the students to reach by the end of the class.

More specifically, the progress report 800 shows a ninth grade level Algebra course that is taught at Central High School by Ms. Smith, second period. Student 4 received an initial assessment of 6 (showing the he needed to perform remediation of at least one topic at a sixth grade level). As of Sep. 1, 2000, Student 4 achieved an assessment of 8, showing the he needed to perform remediation of at least one topic at an eighth grade level. By Oct. 1, 2000, he demonstrated a mastery of all of the mathematics topics needed to begin ninth grade level Algebra and, in fact, was already progressing through the ninth grade level Algebra lessons, as demonstrated by an October 1 assessment of 9.3.

FIG. 9 shows one exemplary embodiment of an assessment report 900 usable in conjunction with the systems and methods of this invention. As shown in FIG. 9, the assessment report 900 includes information regarding the percentage of students, in a particular class, who have demonstrated mastery of the given subjects. For example, the assessment report 900 may show the students mastery of the topics covered in an initial, gateway test.

For example, as shown in FIG. 9, Student 1 demonstrated mastery of and has the requisite fund of knowledge in 93% of the "addition" topics for her grade level, while Student 2 demonstrated mastery of and has the requisite fund of knowledge in 96% of the same topics.

FIG. 10 shows one exemplary embodiment of a school assessment report 1000 usable in conjunction with the systems and methods of this invention. As shown in FIG. 10, the school assessment report 1000 includes information regarding the current percentage of students, in a particular segment of the school, who have demonstrated mastery of the given subjects.

For example, as shown in FIG. 10, 91% of the high school student have demonstrated mastery of and have the requisite fund of knowledge, for their grade level, in the topic of "subtraction", while 94% of the middle school students have the requisite fund of knowledge, for their grade level, in the same topic.

It should be appreciated that similar formats can be used to compare the performance of various students, classes, grades, schools, school systems, and geographic areas or regions.

It should be appreciated that the various exemplary embodiments of the reports in FIGS. 7, 8, 9, and 10 are for a basic understanding of the type of information that can be provided using the standardizing systems and methods of this invention. Therefore, using the systems and methods of this invention, various reports can be generated comparing students, teachers, grade levels, schools, school districts, and school systems without departing from the spirit and scope of the invention.

It should also be appreciated that each of the elements of the integrated, individualized, mastery based, and tutorial supported instruction system 300 shown in FIG. 3 can be implemented as portions of a suitably programmed general purpose computer. Alternatively, each of the elements of the integrated, individualized, mastery based, and tutorial supported instruction system 300 shown in FIG. 3 can be implemented as physically distinct hardware circuits within an ASIC, or using a FPGA, a PDL, a PLA or a PAL, or using discrete logic elements or discrete circuit elements. The particular form that each of the elements of the integrated, individualized, mastery based, and tutorial supported instruction system 300 shown in FIG. 3 will take is a design choice and will be obvious and predicable to those skilled in the art.

Moreover, the systems and methods for providing integrated, individualized, mastery based, and tutorial supported instruction can be implemented as software executing on a programmed general-purpose computer, a special purpose computer, a microprocessor, or the like. In various exemplary embodiments, the systems and methods of this invention can be implemented as a routine embedded in a network client, as a resource residing on a network server, or the like. The systems and methods of this invention can also be implemented by physically incorporating them into a software and/or hardware system, such as the hardware or firmware systems of another personal digital assistant, bi-directional pager, analog or digital cellular telephone, or the like.

Thus, in summary, the systems and methods of this invention can be implemented on a programmed general purpose computer, a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 1A, 1B, 4A, 4B, 5, and/or 6 or produce appropriate reports as shown and/or described herein, can be used to implement the systems and methods for providing integrated, individualized, mastery based, and tutorial supported instruction.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. An interactive system for providing objectively managed, individually tailored learning, the system comprising:

a computer that allows a user to receive, view, and respond to testing and lesson materials;

a memory that stores accessible curriculum, user, and records information;

means for allowing the system to interactively assess a user's fund of knowledge and deficiencies in a particular subject area;

means for allowing the system to interactively provide an individualized instruction plan to remediate deficiencies in the user's fund of knowledge; and means for allowing the system to interactively assess the user's progress through a prescribed curriculum.

2. A method for providing objectively managed, individually tailored integrated teaching, comprising the steps of:
determining an individual's fund of knowledge in a particular subject;
determining deficiencies in the individual's fund of knowledge in the particular subject;
placing the individual in a group, wherein each member of the group possesses a similar fund of knowledge in the particular subject;
providing instruction for the group, wherein the instruction is provided, by an instructor, at a level of complexity that can be understood by the members of the group;
providing individualized, computer based instruction to the individual in the form of at least one lesson to remediate determined deficiencies in the individual's fund of knowledge.

3. The method of claim 2, wherein determining an individual's fund of knowledge includes the steps of:
assessing the individual's responses to an assessment test; and
determining, based on the assessed responses, the individuals level of comprehension of the material covered in the assessment test.

4. The method of claim 2, wherein determining deficiencies in the individual's fund of knowledge includes assessing the individual's incorrect responses to an assessment test to determine topics within the particular subject, wherein the individual shows entered incorrect responses.

5. A method for providing objectively managed, individually tailored learning, comprising the steps of:
determining an individual's fund of knowledge in a particular subject;
determining deficiencies in the individual's fund of knowledge in the particular subject;
placing the individual in a group, wherein each member of the group possesses a similar fund of knowledge in the particular subject;
providing direct instruction for the group, wherein the direct instruction is provided, by an instructor, at a level of complexity that can be understood by the members of the group.

6. The method of claim 5, including the step of providing individual direct instruction to at least one member of the group.

7. The method of claim 5, wherein determining an individual's fund of knowledge includes the steps of:
assessing the individual's responses to an assessment test; and
determining, based on the assessed responses, the individuals level of comprehension of the material covered in the assessment test.

8. The method of claim 7, wherein the assessment test is a standardized test.

9. The method of claim 8, wherein:
determining deficiencies in the individual's fund of knowledge includes assessing the individual's incorrect responses to an assessment test to determine topics within the particular subject, wherein the individual shows entered incorrect responses.

10. The method of claim 5, wherein the step of providing direct instruction for the group includes providing periodic direct instruction in a general topic area in which each member of the group demonstrated a deficient fund of knowledge.

11. The method of claim 5, wherein the step of providing direct instruction for the group includes the step of periodically reassessing the fund of knowledge of at least one member of the group and moving the reassessed individual to a more appropriate group such that the reassessed individual is in a group wherein each member of the group possesses a similar fund of knowledge in the particular subject.

12. The method of claim 11, wherein the step of providing individualized, computer based instruction to the individual to remediate determined deficiencies includes providing individualized, computer based instruction that provides at least one lesson that covers a topic within the particular subject wherein the individual has a determined deficiency.

13. The method of claim 11, wherein the step of providing individualized, computer based instruction to the individual to remediate determined deficiencies includes creating an individual instruction plan to remediate the individual's determined deficiencies.

14. The method of claim 13, further including the step of periodically determining the individual's progress through the individual instruction plan to review the individual's progress through the plan.

15. The method of claim 14, wherein step of periodically determining the individual's progress includes testing the individual's comprehension of the materials covered in the at least one lesson prior to allowing the individual to continue to another lesson.

16. The method of claim 15, further including the step of generating at least one report based on the individual's periodically determined progress.

17. The method of claim 11, further including the step of generating at least one report based on the individual's determined fund of knowledge in the particular subject.

18. The method of claim 11, further including the step of generating at least one report based on the individual's determined deficiencies in the individual's fund of knowledge in the particular subject.

19. The method of claim 11, further including the step of generating at least one report based on the group's fund of knowledge in the particular subject.

20. The method of claim 11, further including the step of generating at least one report based on the group's determined deficiencies in the particular subject.

21. A method for providing individually tailored, objectively managed, group teaching, comprising the steps of:
providing at least one individual with an initial assessment test in a subject area;
assessing the individual's initial assessment test responses to determine the individual's fund of knowledge in the subject area;
assessing the individual's initial assessment test responses to identify any deficiencies in the individual's fund of knowledge;
generating an individualized, specific computer-based individual instruction plan for the individual, wherein the individual instruction plan includes individual lessons, which cover determined areas in which the individual has a deficient fund of knowledge;
providing the individual with at least one individualized lesson, based on the individual's determined individual instruction plan;
allowing the individual to progress through the provided individual lesson;
providing, upon completion of the provided individual lesson, a lesson mastery test to determine whether the individual mastered the provided individual lesson;

determining, based on responses to the lesson mastery test, whether the individual mastered the provided individual lesson;

providing, if it is determined that the individual has not mastered the provided individual lesson, at least one additional individual lesson;

providing, if it is determined that the individual has mastered the provided individual lesson a next individualized lesson, based on the individual's determined individual instruction plan;

placing the individual in a group based on the individual's determined fund of knowledge, wherein each member of the group possesses a similar fund of knowledge in the particular subject;

providing the group with periodic, generalized instruction that is commensurate with the group's determined fund of knowledge within the subject area; and periodically reassess each individual's progress and redistribute the individuals within the various the groups as necessary to maximize group dynamics and effectiveness.

22. The method of claim 21, wherein the steps of assessing the individual's initial assessment test responses to determine the individual's fund of knowledge in the subject area and to identify any deficiencies in the individual's fund of knowledge include the step of evaluating the individual's responses to individual initial assessment test questions.

23. The method of claim 21, wherein the step of assessing the individual's initial assessment test responses to determine the individual's fund of knowledge in the subject area includes the step of assigning a numeric value to the individual's determined fund of knowledge.

24. The method of claim 21, wherein the step of assessing the individual's initial assessment test responses to identify any deficiencies in the individual's fund of knowledge include the step of assigning a numeric value to the individual's determined deficiency.

25. The method of claim 21, wherein the generalized instruction is provided to the instructor as part of a lesson plan.

26. The method of claim 25, wherein the lesson plan includes a scripted text, an outline of a lesson, or a general topic outline for the instructor.

* * * * *